(12) United States Patent
Woehrle et al.

(10) Patent No.: US 9,188,964 B2
(45) Date of Patent: Nov. 17, 2015

(54) SAFETY CONTROLLER FOR CONTROLLING AN AUTOMATED INSTALLATION AND METHOD FOR GENERATING A USER PROGRAM FOR A SAFETY CONTROLLER

(75) Inventors: Stefan Woehrle, Ostfildern (DE); Matthias Reusch, Hohenstein (DE)

(73) Assignee: PILZ GMBH & CO. KG, Ostfildern (DE)

( * ) Notice: Subject to any disclaimer, the term of this patent is extended or adjusted under 35 U.S.C. 154(b) by 980 days.

(21) Appl. No.: 13/275,855

(22) Filed: Oct. 18, 2011

(65) Prior Publication Data

US 2012/0078392 A1    Mar. 29, 2012

Related U.S. Application Data

(63) Continuation of application No. PCT/EP2010/002437, filed on Apr. 20, 2010.

(30) Foreign Application Priority Data

Apr. 20, 2009 (DE) .......................... 10 2009 019 088

(51) Int. Cl.
     *G05B 9/02*          (2006.01)
     *G05B 9/03*          (2006.01)
                 (Continued)

(52) U.S. Cl.
CPC ... *G05B 9/03* (2013.01); *G05B 9/00* (2013.01); *G05B 15/02* (2013.01); *G05B 2219/14006* (2013.01)

(58) Field of Classification Search
CPC .................... G05B 9/00; G05B 15/02; G05B 2219/14006; G05B 2219/1401; G05B 9/03
USPC .................. 700/3, 19, 21, 79, 86; 714/25
See application file for complete search history.

(56) References Cited

U.S. PATENT DOCUMENTS 5,781,752 A * 7/1998 Moshovos et al. ............. 712/216
2004/0064205 A1* 4/2004 Kloper et al. ................... 700/86

(Continued)

FOREIGN PATENT DOCUMENTS

DE    199 06 695 A1    8/2000
DE    100 25 085 A1    12/2001

(Continued)

OTHER PUBLICATIONS

CEI IEC 61508-2; Functional safety of electrical/electronic/programmable electronic safety-related systems—Part 2: Requirements for electrical/electronic/programmable electronic safety-related systems; May 2000; 150 pages.

(Continued)

*Primary Examiner* — Kenneth M Lo
*Assistant Examiner* — Chad Rapp
(74) *Attorney, Agent, or Firm* — Harness, Dickey & Pierce, P.L.C.

(57) ABSTRACT

A safety controller for controlling an automated installation in accordance with a user program has a plurality of control components. At least some of the control components have a respective data bus interface. The data bus interface is designed to receive and send data. The safety controller also has a data bus to which the plurality of control components are connected via the respective data bus interfaces for the purpose of interchanging data. A configuration interface is designed to receive configuration data ascertained on the basis of association data generated by a programming tool. The configuration data determine at least one characteristic of the data bus or of at least one data bus interface.

12 Claims, 7 Drawing Sheets

(51) Int. Cl.
*G05B 15/02* (2006.01)
*G05B 9/00* (2006.01)

(56) References Cited

U.S. PATENT DOCUMENTS

2005/0144523 A1* 6/2005 Sierer et al. .................. 714/25
2006/0056285 A1* 3/2006 Krajewski et al. ........... 370/216

FOREIGN PATENT DOCUMENTS

| DE | 10 2004 063 213 A1 | 7/2006 |
|---|---|---|
| JP | 3-282906 | 12/1991 |
| JP | 4-213299 | 8/1992 |
| JP | 8-328616 | 12/1996 |
| JP | 2003-186507 | 7/2003 |
| JP | 2003-271208 | 9/2003 |
| JP | 2009-42913 | 2/2009 |
| WO | WO 2007/075097 A1 | 7/2007 |
| WO | WO 2007/116798 A1 | 10/2007 |

OTHER PUBLICATIONS

EN ISO 13849-1; Safety of machinery—Safety-related parts of control systems—Part 1: General principles for design; Nov. 2006; 96 pages.
DIN EN 954-1; Safety-related parts of control systems—Part 1: General principles for design; Mar. 1997; 34 pages.

* cited by examiner

SAFETY CONTROLLER FOR CONTROLLING AN AUTOMATED INSTALLATION AND METHOD FOR GENERATING A USER PROGRAM FOR A SAFETY CONTROLLER

CROSS REFERENCES TO RELATED APPLICATIONS

This application is a continuation of international patent application PCT/EP2010/002437 filed on Apr. 20, 2010 designating the U.S., which international patent application has been published in German language and claims priority from German patent application DE 10 2009 019 088.0 filed on Apr. 20, 2009. The entire contents of these priority applications are incorporated herein by reference.

BACKGROUND OF THE INVENTION

The present invention relates to a safety controller for controlling an automated installation in accordance with a user program running on the safety controller, and to a method for generating a user program for such a safety controller.

A safety controller in terms of the present invention is an apparatus which picks up input signals delivered by sensors and produces output signals therefrom by virtue of logic combinations and possibly further signal or data processing steps. The output signals are typically supplied to actuators which take the output signals as a basis for prompting actions or reactions in a controlled installation.

A preferred field of application for such safety controllers is the monitoring of emergency off pushbuttons, two-hand controllers, guard door switches or light grids in the field of machine safety. Such sensors are used in order to safeguard a machine, for example, which presents a hazard to humans or material goods during operation. When a guard door is opened or when the emergency off pushbutton is operated, a respective signal is produced and supplied to the safety controller as an input signal. In response thereto, the safety controller then uses an actuator to shut down the part of the machine which is presenting the hazard.

In contrast to a "normal" controller, a characteristic of a safety controller is that the safety controller always ensures a safe state for the installations or machines presenting the hazard, even if a malfunction occurs in said safety controller or in a device connected thereto. Extremely high demands are therefore made of safety controllers in terms of their own failsafety, which results in considerable complexity for development and manufacture.

Usually, safety controllers require particular approval from competent supervisory authorities, such as the professional associations or what is called TÜV in Germany, before they are used. In this case, the safety controller must observe prescribed safety standards as set down, by way of example, in European standard EN 954-1, standard IEC 61508, standard EN ISO 13849-1 or other comparable standards. In the following, a safety controller is therefore understood to mean an apparatus which at least complies with safety category 3 of EN 954-1 or the Safety Integrity Level (SIL) of which at least reaches level 2 according to IEC 61508.

A programmable safety controller allows a user to individually define the logic combinations and any further signal or data processing steps according to his needs using a piece of software that is typically known as the user program. This results in a great deal of flexibility in comparison with earlier solutions, in which the logic combinations were defined by selected wiring between different safety relays.

For large and complex prior art installations, distributed safety controllers are often used. Distributed safety controllers have a plurality of spatially distributed control components (control units, sensors and actuators) which communicate with one another via a communication network. The control components are associated with installation components. Installation components are the component parts of the controlled installation, such as handling stations, conveyor belts, individual robots or the like. As regards the hardware, distributed safety controllers provide a high level of flexibility. Thus, a safety controller can be built from a plurality of different control components and can therefore be flexibly varied to suit the circumstances of the installation to be controlled. As regards the configuration of the communication relationships between the individual control components and the issues concerning data processing, however, distributed safety controllers are not yet optimum. They require a high level of configuration complexity before startup. For each control unit, it is necessary to individually determine which input signals are read in and which output signals are output. In addition, the user has to individually determine the communication relationships between all the components in the control system. This also includes time parameters which need to be observed during communication.

Configuration of the communication relationships between the individual control components particularly comprises the following configuration parameters: configuration parameters which define what kind of data are transmitted, i.e. what data type the data to be transmitted have; configuration parameters which define from where to where data are transmitted, i.e. between which control components data interchange takes place; configuration parameters which define how frequently individual data items need to be transmitted; configuration parameters which define how quickly the safety controller needs to react to external circumstances for the safety functions.

SUMMARY OF THE INVENTION

It is therefore an object to provide a safety controller and a method which allow simpler and faster startup.

According to an aspect, there is provided a safety controller for controlling an automated installation in accordance with a user program, the safety controller comprising: a plurality of control components, wherein at least some of the control components have a data bus interface, with the data bus interface being designed to receive and to send data; a data bus connecting the plurality of control components via said data bus interfaces for the purpose of interchanging data; a programming tool for generating the user program; and a configuration interface designed to receive configuration data; wherein the configuration data determine at least one characteristic of at least one data bus interface; and wherein said configuration data is ascertained on the basis of association data generated by the programming tool.

There is also provided a method for generating a user program for a safety controller designed to control an automated installation in accordance with a user program comprising a number of program sections, wherein the safety controller comprises a plurality of control components and a data bus, said control components each having a data bus interface designed to receive and send data, and wherein the plurality of control components are connected to the data bus via the respective data bus interface for the purpose of interchanging data, the method comprising the steps of ascertaining association data representing an association between a subsection of the user program and a defined control component; ascertaining configuration data on the basis of the association data; and configuring at least one data bus interface using the configuration data, with the configuration data determining a characteristic of said at least one data bus interface.

Advantageously, generating the user program, beyond the pure generating of the source code and the machine code, also involves the distribution of the machine code and the configuration data over at least some of the control components.

The novel safety controller and the novel method are based on the idea of automatically ascertaining the configuration data required for configuring the communication relationships on the basis of previously determined association data, and are based on the idea of transmitting said configuration data to the safety controller via a configuration interface then. The configuration is automatically achieved either by the computer program which is used to write the user program for the safety controller, or by a further computer program which is set up specifically for the configuration. The initial guidelines for the configuration are derived from the user program or from the inputs made for generating the user program, for example. In this case, although the intention is to allow the programmer of the user program to make inputs related to the configuration of the communication relationships, he does not need to perform the actual configuration. This is done automatically by said computer program. Subsequently, instead of the wording "configuration of the communication relationships between the individual control components", the wording "configuration of the communication relationships" will be used for short.

The configuration data determine at least one alterable characteristic of the data bus and/or at least one alterable characteristic of the data bus interfaces contained in the control components. This allows automatic configuration of the communication relationships. As a result, the implementation of the safety controller, which comprises generating the user program and configuring the communication relationships, is simplified. There is an overall reduction in the time involvement and hence also in the costs for setting up a safety controller.

The automatic configuration of the communication relationships also increases the failsafety of the safety controller. The automation precludes sources of error which may be present in the case of configuration which does not take place automatically. In addition, flexibility is increased. In the event of changes in the project or in the safety controller produced, any resulting adapted configuration data can easily be ascertained therefrom and transferred to the safety controller. Such changes may be necessary in the case of the following situations by way of example: if, after the implementation of a safety controller, it is found during trial operation that the performance of the safety controller turns out to be too low in respect of one parameter, this can be rectified by replacing an already existing control component or by adding an additional control component. Both changes require adaptation of the configuration data, since the communication relationships have been changed or complemented. Another example is the replacement of a faulty control component in a safety controller which is already in operation.

In addition, automatic configuration of the communication relationships achieves optimization of the data interchange between the individual control components. This opens up greater scope for meeting the guidelines of the owner of the installation to be controlled in terms of reaction times for the safety controller. Overall, it is therefore possible to produce shorter reaction times.

Preferably, the configuration data determine both the properties of the data bus which are relevant to the data interchange and the properties of the data bus interfaces contained in the control components which are relevant to the data interchange. These may be to some extent the same or to some extent different properties.

The association data advantageously represent associations among individual subsections in the user program or associations among individual subsections in the user program and individual control components. These associations produce the data which are relevant to the configuration of the communication relationships. By way of example, these associations can thus be used to infer what kind of data are being transmitted and from where to where these data are being transmitted. A subsection in the user program may be a program module contained in the user program or a plurality of control instructions, for example.

In a refinement of the invention, the user program is build from a plurality of program modules, wherein the association data comprise program module association data, wherein the program module association data represent a number of program module associations, wherein the program module associations each define which control component has the respective program module associated with it.

The program module association data represent a physical allocation for the user program parts across the distributed safety controller elements. This is a hardware-related association representing which program module is associated with which control component. Hence, the respective processing location within the safety controller is known for the individual program modules. This piece of information is significant for producing data interchange within a safety controller of distributed design. This piece of information can be used to infer which data are produced in which control component and which data are consumed in which control component.

In addition, this refinement allows optimization of the data transmission within a safety controller of distributed design according to a wide variety of aspects.

According to a first aspect, the individual program modules are associated with the individual control components such that the program modules and hence the subsections in the user program defined by said program modules in each case are processed in situ. This reduces the data interchange between individual control components. In this connection, in situ means that the program modules are processed at the location at which data required for processing them are available. By way of example, that is to say in a control unit which is in direct proximity to a sensor, the sensor signal from which is required as an input signal for ascertaining an actuation signal for an actuator. This association allows short reaction times to be produced. Preferably, the program modules are associated with the individual control components by the writer of the user program.

According to a second aspect, the individual program modules are associated with the individual control components automatically by the computer program which is used to write the user program. This association can be made using data processing characteristic figures, for example. This association allows optimum use of resources which are available in the safety controller, for example data memory or microprocessors. This allows optimum adaptation of the configuration of the communication relationships to suit the technical circumstances of the safety controller.

Advantageously, not all the program modules of a user program need to be associated with control components. It is also feasible to make an association for just some of the program modules.

In a further refinement of the invention, the user program comprises a plurality of control instructions, wherein the association data comprise processing association data representing a number of processing associations, wherein the processing associations define, for at least some of the control instructions, a processing order for the individual control instructions.

The processing association data represent a processing order and hence a flow of data between individual control instructions. This involves a software-related or programming-related association that shows which data are interchanged between individual control instructions. This allows the flow of data to be comprehensively presented, which allows optimum interpretation of the configuration data and hence configuration of the communication relationships. In addition, this allows modularized configuration of the communication relationships and ultimately simple handling.

Advantageously, the portion of the control instructions is those control instructions which are contained in a program module. Alternatively, the portion of the control instructions comprises a first subsection of control instructions which is contained in a first program module and a second subsection of control instructions which is contained in a second program module. This allows the data interchange between individual program modules to be optimized.

In a further refinement of the invention, the plurality of control instructions comprise a plurality of data-producing control instructions and a plurality of data-consuming control instructions, wherein the ascertainment of the processing association data depends on whether data-consuming control instructions or data-producing control instructions are involved.

This refinement firstly has the advantage that different specifications can be taken into account for data-producing control instructions and for data-consuming control instructions. Secondly, this refinement ensures that the presentation of the flow of data covers all intermediate steps. Overall, this refinement allows comprehensive and hence optimum configuration of the communication relationships.

In a further refinement of the invention, the configuration data are also ascertained on the basis of a number of predefined control parameter values.

This refinement has the advantage that the operator of the installation can prescribe a control response desired for the safety controller, which control response is initially independent of the specific design of the safety controller. The desired control response then determines the details of the safety controller. Thus, by way of example, the individual components of the safety controller are selected on this basis. In addition, it produces guidelines for the data interchange in the safety controller. The guidelines of the owner of the installation can therefore be observed by the technical details of the control components. The configuration data are ascertained on the basis of invariant, i.e. firmly prescribed, control parameter values. The control parameter values can be defined during the generation of the user program, for example. Alternatively, it is feasible for the control parameter values not to be defined until afterwards.

Advantageously, each of the control parameters represents a separate subaspect of the control response of the safety controller. This may be a subaspect of the overall control response, the overall control response being defined by the whole safety controller build from a plurality of control components. Alternatively, the subaspect may relate to the control response of an individual control component contained in the safety controller.

This refinement advantageously allows an automatic check to determine whether individual control components selected for producing the safety controller are at all suitable for satisfying the predefined control parameter values.

In a further refinement, the control parameters taken into account may be at least one of the following control parameters: a first control parameter which represents a reaction time, a second control parameter which represents a cycle time, and a third control parameter which represents a sampling rate.

These are essential control parameters which characterize the overall control response of a safety controller. Complete configuration of the communication relationships is therefore possible.

The reaction time may be the reaction time of the safety controller as a whole. Alternatively, it may be the reaction time of an individual safety function produced by the safety controller. It is thus possible to establish different reaction times for individual installation parts monitored by the safety controller.

The cycle time may be a cycle time prescribed as standard for the entire safety controller. Alternatively, it may be a cycle time which is individually set for a control component or even for a data processing unit contained in a control component, for example a data bus interface. Alternatively, it may be the cycle time of the data bus. It is also feasible that the cycle time relates to a signal processing chain. A signal processing chain is a series of control instructions, as are present within a program module, for example. In general, they are control instructions between which there is a processing order.

The sampling rate is the cycle time of input/output devices contained in the safety controller. A standard sampling rate may apply to the entire safety controller. Alternatively, the sampling rate may be set individually, for example for individual control components or for individual data processing units contained in control components.

In a further refinement, the configuration data are also ascertained on the basis of a number of data processing characteristic figures.

A data processing characteristic figure represents a characteristic of a component used in the data processing, which characteristic is relevant to the data processing. A data processing characteristic figure therefore permits a statement about the performance of this component in terms of data processing. By way of example, this is the clock frequency of a microprocessor, the storage capacity of a data memory or the data transfer rate of the data bus or a data bus interface. Advantageously, the data processing characteristic figures relate to the individual control components and therefore represent the properties of the data processing units installed in the respective control component. By using data processing characteristic figures, it is possible to take account of hardware-related circumstances for the configuration of the communication relationships. It is therefore possible to coordinate the guidelines for the control response, which are provided by the owner of the installation, with the hardware-related circumstances.

Preferably, the values of the data processing characteristic figures are stored for the individual control components in a database, the database being located on that computer which is used to execute the computer program for generating the user program. Alternatively, these values may also be stored in the individual control components and are then read.

In a further refinement, the association data, in particular the program module association data, are ascertained on the basis of the number of data processing characteristic figures.

The idea of ascertaining the association data on the basis of data processing characteristic figures has the advantage that subsections in the user program can be associated with individual control components from the perspective of optimized data processing. Thus, subsections in the user program which require a high level of computation power in order to process them can be processed, by way of example, in control components which are equipped with a powerful microprocessor. This allows particularly optimized configuration of the communication relationships.

For the refinement according to which the program module association data are ascertained on the basis of the data processing characteristic figures, the following advantageous procedure is feasible: first of all, the programmer of the user program can prescribe the program module associations for the purpose of processing in situ. Next, by taking account of data processing characteristic figures, it is possible to check whether the respective control components are powerful enough for processing the respective program modules. If necessary, the programmer can be directed to make a change in the program module association. Alternatively, it is conceivable to permit automatic optimization of the program module associations by the computer program which is used to write the user program.

In a further refinement, at least some of the control components have a respective data memory, wherein the data memories each are designed to store respective data which are supplied to them, wherein the safety controller also has a distribution unit, the distribution unit being designed to distribute at least some of the configuration data over at least some of the control components via the data bus.

This refinement has the advantage that configuration data can be specifically stored in individual data memories. By way of example, this allows configuration data to be stored in what are known as intelligent input/output units. These are, in particular, safety-related sensors and actuators which have data processing units, such as microprocessors and data memories. As a result, data memories existing largely unused in a safety controller can be filled with configuration data and can therefore be used. This means that control units which are present in a safety controller can in future be equipped with smaller data memories, and therefore the costs for a safety controller can be reduced. At the same time, this refinement allows short reaction times. Configuration data can be stored at the locations at which they need to be processed. This reduces the data interchange between the control components.

Preferably, the configuration data are distributed over the individual control components on the basis of the association data, particularly the program module association data. Furthermore, it is advantageous if at least some of the data memories are designed to store the respectively supplied configuration data in nonvolatile fashion. This refinement has the advantage that the configuration data remain available after a power failure or after the safety controller is switched off, for example. This increases the availability of the safety controller. It is not necessary for the safety controller to be reinitialized. By way of example, this involves the use of memory cards in the form of SD cards or CF cards or else the use of flash memories.

In a further refinement, at least some of the configuration data are stored redundantly in the data memories.

The redundant storage of the configuration data is achieved by doubling the respective configuration data. The doubled configuration data are then distributed separately over the data memories, specifically with the proviso that the original configuration data and the doubled configuration data each are stored in a different data memory. This measure increases the availability of the safety controller and hence of the controlled installation. If a non-safety-related control component fails, for example, then the configuration data which was stored in its data memory continue to be available, since they are also stored in a different data memory.

Advantageously, not only the configuration data but also program data and/or parameterization data are distributed over the individual control components. In this case, the program data represent the user program and are produced when the user program is written. Particularly in the case of the program data, it is advantageous to be able to store them at the location at which required sensor signals are present or actuation signals for actuators need to be provided, for example. The parameterization data represent value ranges for individual variables or functionalities which are used in the user program. The configuration data, the program data and the parameterization data are collectively referred to as project data which represent an application running on the installation. Both for the program data and for the parameterization data, the above explanations regarding association, storage and refinement of the data memories apply accordingly.

In a further refinement, the distribution unit is one of the data memories.

This refinement has the advantage that the distribution of the configuration data does not require any additional unit to be provided in the safety controller. The configuration data are distributed by one of the data memories which are present in the safety controller anyway. This allows inexpensive production of the safety controller. Advantageously, this involves at least one of the data memories being designed to forward supplied configuration data to at least one other data memory or to request configuration data stored in another data memory. This allows flexible distribution of the configuration data over the individual data memories. This even makes it possible to distribute the configuration data over the data memories arbitrarily.

Alternatively, an external distribution unit can be used which is at least intermittently connected to an interface provided for this purpose in the safety controller. It is particularly advantageous if the external distribution unit is located in that computer which is used to write the user program. This means that the configuration data can be transmitted directly from the computer to the safety controller.

In a further refinement, the configuration data are split into a plurality of data blocks, wherein at least one data block is associated with the data bus and the remaining data blocks are each associated with at least one of the data bus interfaces.

This refinement has the advantage that the configuration data can be allocated to the data bus and the data bus interfaces in targeted fashion in accordance with a distribution criterion. The configuration data can be processed in situ, which allows short reaction times, inter alia.

As far as the arrangement of a data bus manager which is required for operating the data bus is concerned, a plurality of refinements are feasible. The data bus manager may be contained in one of the control components. In this case, the data block associated with the data bus is stored in the data memory in this control component. In another refinement, the data bus manager may be of separate design and is therefore not contained in one of the control components. The data block associated with the data bus is then preferably stored in a data memory which is contained in the data bus manager.

In a further refinement, the configuration data comprise the following data: validity time data, which represent a validity period during which data produced are valid, and/or waiting time data, which represent a waiting period during which a data-consuming control instruction awaits data which are to be consumed by it, and/or termination cycle time data, which represent a termination cycle time, wherein the termination cycle time is the basis for a plurality of control instructions, and/or synchronization data, on the basis of which the control components can be synchronized, and/or data frame allocation data, which represent a number of data frame allocations, wherein the data frame allocations define, for at least one of the control components, those data fields within a data frame specified for the data bus which are allocated to the control components for the data which are to be sent thereby and for the data to be received thereby.

The validity time data relate to data-producing control instructions. Preferably, a validity period is defined individually for each data-producing control instruction. Alternatively, it is possible that a common validity period is prescribed for a plurality of data-producing control instructions related by means of processing associations, for example.

The waiting time data relate to data-consuming control instructions. In this case too, an individual waiting period is preferably defined for each data-consuming control instruction. In accordance with the statements relating to the validity time data, a common waiting period can also be prescribed for a plurality of data-consuming control instructions. In an alternative consideration, the waiting period can also be regarded as being that period within which a data-producing control instruction needs to provide data which are processed or consumed by another control instruction.

The effect of introducing a termination cycle time is that safety controllers which by nature do not necessarily have a deterministic response in terms of reaction time do exhibit a deterministic response in this regard. The termination cycle time defines equidistantly spaced time intervals at which data produced by data-producing control instructions need to be present in standard form. This provides for a deterministic response. Preferably, a number of processing associations define a processing order for the plurality of control instructions which were based on the termination cycle time. Preferably, at least some of the individual validity periods are defined such that they each expire at a time defined by the termination cycle time, with the individual validity periods preferably expiring at different times.

Preferably, the synchronization data are used to synchronize the individual clocks and/or the individual timer interrupt requests of the control components. As a further preference, the synchronization data can also influence the way in which the data bus works.

The data frame allocation data allow the use of an Ethernet-based field bus, particularly a data bus system, which works on the basis of the SafetyNet P® communication model which can be attributed to the applicant. In the case of such a data bus system, a first control component connected to the data bus produces a data frame having a plurality of data fields. Every further control component is explicitly allocated at least one data field to be filled with transmission data. The data frame is sent as an outgoing data frame from one control component to the next, with each control component filling a data field that has been allocated to it with transmission data. The last control component returns the data frame as a returning data frame to the series of control components. In this case, the control components read extraneous transmission data from the data fields of the returning data frame, the respective data fields having been allocated to the control components individually.

Furthermore, the configuration data may be stipulation data which define for the individual control components the respective data to be processed according to their data type. If a data bus system is used in which data can be transmitted with different data bus cycle times, as is the case with the aforementioned data bus system operating on the basis of the SafetyNet P® communication model, then the configuration data may also be data bus cycle data which determine, for individual control instructions or a plurality of control instructions, which data bus cycle time will be used for transmitting the data thereof.

The configuration data presented above allow comprehensive configuration of the communication relationships.

The novel safety controller and the novel method can be used to comprehensively configure the communication relationships automatically. This involves configuring the input maps and the output maps of the individual control components, associating the individual input maps and the individual output maps, and ascertaining the configuration data for the control components, particularly the respectively contained data bus interfaces, and the data bus.

Advantageously, a data bus interface not only allows data interchange between the data bus and that control component which contains it, it is also responsible for organizing the data interchange within the control component.

The application running on the installation to be controlled can also be referred to as a process which comprises both standard control tasks and safety control tasks.

It goes without saying that the features cited above and the features yet to be explained below can be used not only in the respectively indicated combination but also in other combinations or on their own without departing from the scope of the present invention.

BRIEF DESCRIPTION OF THE DRAWINGS

Exemplary embodiments of the invention are shown in the drawing and are explained in more detail in the description below. In the drawing.

DESCRIPTION OF PREFERRED EMBODIMENTS

Figure 1:
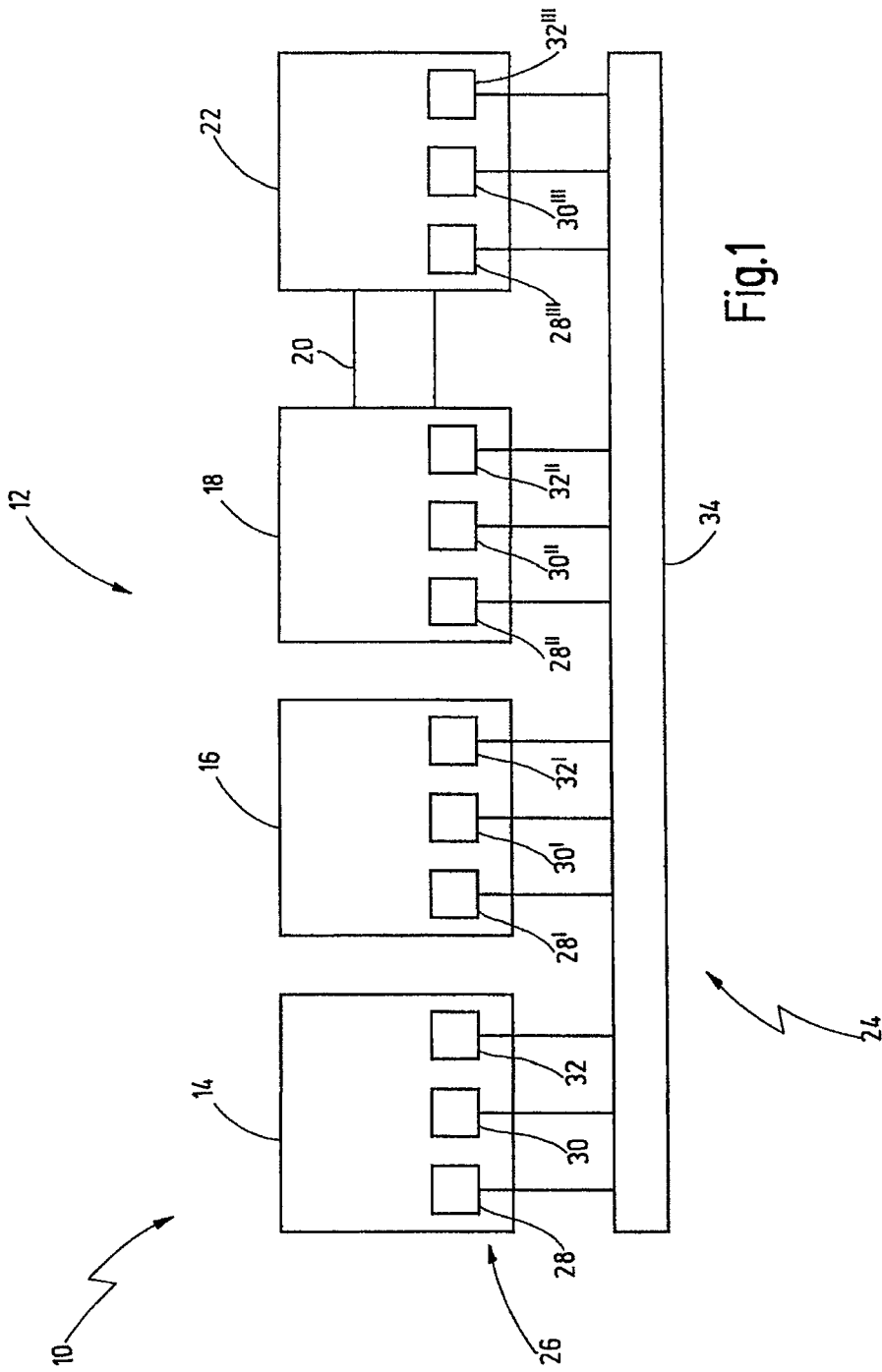
FIG. 1 shows a schematic illustration of an installation to be controlled.

In FIG. 1, an installation to be controlled is denoted as a whole by the reference numeral 10.

The installation 10 comprises a plurality of installation components 12. In the present exemplary embodiment, it is a fitting station 14, a handling station 16, a test station 18, a conveyor unit 20 and a packaging and palleting station 22.

Furthermore, a safety controller is denoted as a whole by reference numeral 24. The safety controller 24 has a plurality of control components 26. The control components 26 are control units 28, sensor units with connected sensors 30, and actuator units with connected actuators 32. In this case, the individual control units 28, sensors 30 and actuators 32 are each functionally associated with an installation component 12 and are frequently also physically arranged at that location. The control components 12 are networked together via a data bus 34. Accordingly, the control components 26 have data bus interfaces (not shown here). Preferably, this involves a data bus, based on the Ethernet standard, which operates particularly on the basis of the SafetyNet P® communication model of the assignee of the present application. In the case of SafetyNet P®, the control components 26 communicate on the basis of what is known as the producer/consumer principle, i.e. each control component taking part in the communication sends data "undirected" to the other control components at large, and each control component reads data from other control components from the "pool" of provided data. Preferably, a selected control component, particularly what is known as a data bus manager, produces, with cyclic recurrence, a data frame having a plurality of data fields which passes through all the other control components in order. Each control component places its transmission data into predefined data fields of the circulating data frame and reads extraneous transmission data from other predefined data fields. This communication model is described in DE 10 2004 063 213 A1 which is incorporated by reference.

The fitting station 14 is used to fill the handling station 16 with workpieces. These workpieces (not shown here) are handled in the handling station 16. Next, the handled workpieces are forwarded from the handling station 16 to the test station 18, which checks whether the handled workpiece satisfies predefined checking criteria. If these checking criteria are satisfied, the handling station 16 can be filled with a new workpiece again. The handled workpiece is transferred by means of the conveyor unit 20 to the packaging and palleting station 22. The latter combines a plurality of handled workpieces into trading units which are then stacked on a pallet.

The operating areas of the individual stations 14, 16, 18, 22 may be protected by guard doors, for example, which are monitored by means of guard door switches. Alternatively or in addition, light grids or light curtains can be used. Furthermore, the individual stations 14, 16, 18, 22 may be provided with emergency off pushbuttons which can be used to transfer the respective station to a safe state. This is done by means of appropriate actuation of contactors arranged in the respective power supply. The aforementioned guard door switches, light grids, light curtains and emergency off pushbuttons are safety-related sensors 30. The contactors are safety-related actuators 32. The sensors 30 may furthermore comprise non-safety-related sensors, such as a sensor for indicating tool wear or an unsafe position indicator.

In the present exemplary embodiment, each station 14, 16, 18, 22 has an associated control unit 28. Accordingly, the control units 28 in this case are in the form of physically separate components. This likewise applies to the sensor units 30 and the actuator units 32. Alternatively, it is conceivable for a common control unit to be associated with two stations, for example.

In FIG. 1, components having the same function have been designated with the same reference numeral, the use of strokes indicating that the individual components having the same reference numeral may be of entirely different design on account of the individual association with individual installation components 12. The same also applies to signals. This form of reference numerals also applies to the subsequent figures.

Figure 2:
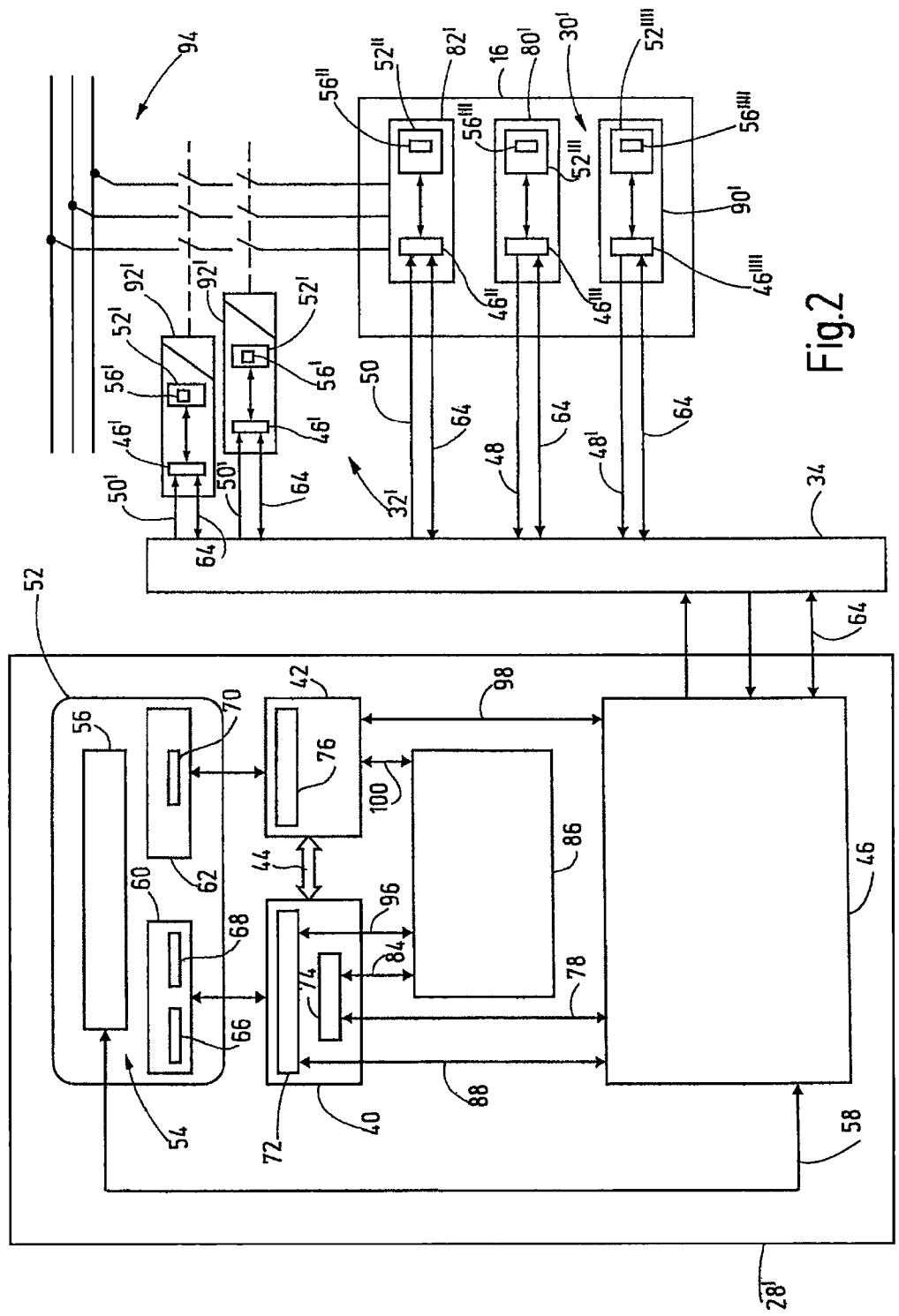
FIG. 2 shows a schematic illustration of control components arranged on an installation component.

FIG. 2 shows the handling station 16 and the control components associated therewith further details. In this case, the control unit 28' is of two-channel redundant design in order to achieve the necessary failsafety for controlling safety-critical applications and processes. To represent the two-channel design, two separator processors, namely a first processor 40 and a second processor 42, are shown. The two processors 40, 42 are connected to one another via a bidirectional communication interface 44 in order to be able to monitor one another and interchange data. Preferably, the two channels of the control unit 28' and the two processors 40, 42 are of a diverse design, i.e. of a different design from one another, in order to preclude systematic errors.

Reference numeral 46 denotes a data bus interface which is in contact with each of the two processors 40, 42. The data bus interface 46 picks up control input signals 48, 48' containing input data from the sensors 30' and forwards them in a customized data format to each of the two processors 40, 42. In addition, the data bus interface 46 takes the processors 40, 42 as a basis for producing control output signals 50, 50' containing output data which are used to actuate the actuators 32'.

Reference numeral 52 denotes a data memory which stores project data 54 in the form of data blocks. This involves a first data block 56 which contains configuration data 58 for the data bus interface 46. Furthermore, the data memory 52 contains a second block 60 and a third block 62. The two blocks 60, 62 contain program commands which represent a user program which is executed in the control unit 28'. The data memory 52 is designed such that all of the project data 54 stored are stored in non-volatile fashion. To this end, the data memory 52 is in the form of a flash memory, an SD card or a CF card, for example. For reasons of clarity, any parameterization data contained in the project data 54 have not been shown.

The actuators 32' and the sensors 30' likewise have data bus interfaces 46', 46", 46'", 46"". Furthermore, the actuators 32' and the sensors 30' have data memories 52', 52", 52'", 52"" for storing data blocks 56', 56", 56'", 56"" which contain configuration data for the respective data bus interface 46', 46", 46'", 46"". This is not intended to have any restricting effect. Not all the control components need to have data memories. The configuration data from those control components which have no data memory may also be stored in a data memory in another control component. Any interchange of configuration data which is required for this purpose is indicated by arrows 64.

The data bus interface 46 ensures that data interchange between the control unit 28' and the data bus 34 takes place on the basis of a communication protocol for the data bus 34. In the preferred exemplary embodiments, the data bus interface 46 produces Ethernet-compatible bus messages which have embedded data frames with the data which are to be interchanged between individual control components. The data bus interface 46 may contain further functional units, but these are not shown in FIG. 2 for reasons of clarity. This may involve an event broker, which can be used to interchange data on an event basis. This may also involve a data broker, which can be used to perform data-based data interchange. The data bus 34 shown in FIG. 2 may contain a communication medium, one or more switches and a data bus manager.

The project data 54 are available in binary form, i.e. as a machine code. For failsafe operation of the control unit 28', the data memory 52 stores two data blocks 60, 62 with program data. The second data block 60 is intended for the first processor 40 and the third data block 62 is intended for the second processor 42. The second data block 60 comprises a first safety code 66 and a standard code 68. The first safety code 66 comprises those control instructions which need to be executed by the first processor 40 within the context of the safety tasks that need to be accomplished by the control unit 28'. These kinds of control instructions are subsequently referred to as safety control instructions. The standard code 68 comprises those control instructions which need to be executed by the first processor 48 within the context of the standard tasks that need to be accomplished by the control unit 28'. These kinds of control instructions are subsequently referred to as standard control instructions. The third data block 62 comprises a second safety code 70, which comprises those control instructions which need to be executed by the second processor 42. These control instructions are subsequently likewise referred to as safety control instructions.

Depending on the handling progress, the first processor 40 executes a first current safety control instruction 72 and a current standard control instruction 74. Essentially at the same time, the second processor 42 executes a second current safety control instruction 76.

The handling of the current standard control instruction 74, which is a non-safety-related control instruction, involves first non-safety-related data 78 being interchanged between the first processor 40 and the data bus interface 46. By way of example, the first processor 40 is supplied with instantaneous values of non-safety-related control input signals 48 which are produced by non-safety-related sensors 80'. The non-safety-related sensors 80' are such sensors as capture input variables which are required for closed-loop drive control, for example. The non-safety-related sensors 80' are of non-failsafe design. The data bus interface 46 is supplied with instantaneous values of non-safety-related control output signals 50 which are supplied to non-safety-related actuators 82' for the purpose of actuating them. The instantaneous values of the non-safety-related control output signals 50 are ascertained on the basis of the non-safety-related control input signals 48 in accordance with the standard control instructions. This may require the ascertainment of intermediate variables, the instantaneous values of which are supplied by means of second non-safety-related data 84 to a main memory 86 and are buffer-stored therein.

The handling of the first current safety control instruction 72, which is a safety-related control instruction, involves first safety-related data 88 being interchanged between the first processor 40 and the data bus interface 46. In this case, the first processor 40 is supplied with instantaneous values of safety-related control input signals 48' which are produced by safety-related sensors 90'. By way of example, the safety-related sensors 90' are emergency off pushbuttons, guard doors, speed monitoring appliances or other sensors for picking up safety-related parameters. The data bus interface 46 is supplied with instantaneous values of safety-related control output signals 50' which are supplied to safety-related actuators 92' for the purpose of actuating them. By way of example, the safety-related actuators 92' are contactors, the operating contacts of which are arranged in the connection between a power supply 94 and the handling station 16. The power supply 94 for the handling station 16 can therefore be shut down, which means that it is possible to transfer at least the handling station 16 to a safe state in the event of an appropriate malfunction occurring. The instantaneous values of the safety-related control output signals 50' are ascertained on the basis of the safety-related control input signals 48' in accordance with the safety control instructions. This may require the ascertainment of safety-related intermediate variables, the instantaneous values of which are supplied by means of second safety-related data 96 to the main memory 86 and are buffer-stored therein.

The handling of the second current safety control instruction 76, which is a safety-related control instruction, involves proceeding in accordance with the first current safety control instruction 72. For the second current safety control instruction 76, third safety-related data 98, which correspond to the first safety-related data 88, and fourth safety-related data 100, which correspond to the second safety-related data 96, are used in corresponding fashion.

Where the wording "data-producing control instructions" or "data-consuming control instructions" is used in due course, this may in both cases involve either safety control instructions or standard control instructions.

Figure 3:
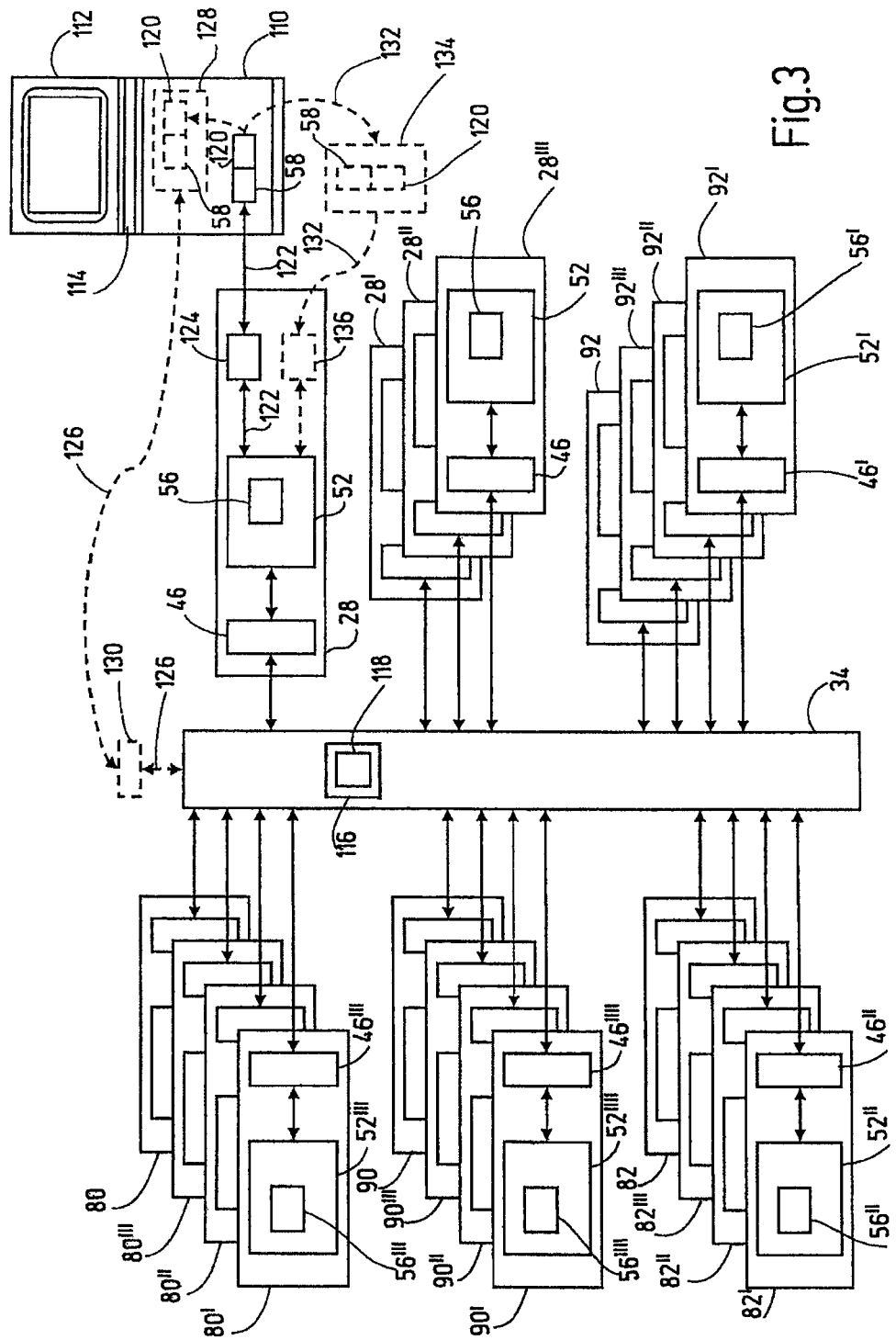
FIG. 3 shows a simplified illustration of a distributed safety controller.

In accordance with the design of the installation 10 shown in FIG. 1, FIG. 3 shows the control units 28, 28', 28", 28''', non-safety-related sensors 80, 80', 80", 80''', non-safety-related actuators 82, 82', 82", 82''', safety-related sensors 90, 90', 90", 90''' and safety-related actuators 92, 92', 92", 92''' together with their contained data bus interfaces 46, 46', 46", 46''', 46'''', data memories 52, 52', 52", 52''', 52'''' and the first data blocks 56, 56', 56", 56''', 56'''' containing the configuration data. For reasons of clarity, primarily the components shown in the topmost drawing plane have been provided with reference numerals. The individual control components are connected to one another by means of the data bus 34.

In FIG. 3, a computer is denoted by the reference numeral 110. The computer 110 is connected to a display unit 112. The computer 110 executes a computer program 114. The computer program 114 allows the production of project data which represent an application running on the installation 10 to be controlled. In this case, the project data comprise program data, configuration data 58 and parameterization data. In the terminology of the art, the computer program 114 is frequently referred to as a programming tool.

In this case, the configuration data 58 produced with the computer 110 are transferred to the data memories 52, 52', 52", 52''', 52'''' and a data bus manager 116. In this context, the data bus manager 116 is preferably a control component which produces the regularly circulating data frame for the communication of all the connected control components. The configuration data for the data bus manager 116 may contain the cycle time for the data transmission, i.e. what period can elapse between two successive data frames, the length of the data frames, the number of data fields and/or timeout parameters.

In this case, the configuration data 58 are split into a plurality of first data blocks 56, 56', 56", 56''', 56'''' and a fourth data block 118. The first data blocks 56, 56', 56", 56''', 56'''' are each associated with one of the data memories 52, 52', 52", 52''', 52''''. The fourth data block 118 is associated with the data bus manager 116. In this case, the configuration data 58 are distributed over the individual data memories 52, 52', 52", 52''', 52'''' and the data bus manager 116 on the basis of association data 120. Therefore, both the data bus 34 and the data bus interfaces 46, 46', 46", 46''', 46'''' have respective associated configuration data 58. As a result, both at least one characteristic of the data bus 34 and at least one characteristic of a data bus interface can be determined by the configuration data 58.

The association data 120 are produced in the computer 110. The association data 120 comprise program module association data, inter alia. The program module association data are used for distributing the configuration data 58 over the individual data bus interfaces 46, 46', 46", 46''', 46'''' and hence data memories 52, 52', 52", 52''', 52'''' and the data bus manager 116. Preferably, the computer 110 provides not the entire association data but rather only the program module association data for distributing the configuration data 58.

In order to be able to distribute the configuration data 58, these data are supplied to a distribution unit. Three different procedures are possible in this case. The safety controller 24 may be designed such that a programmer can select one of these three procedures as he desires. Alternatively, it is conceivable for just one or two of these procedures to be provided.

A first procedure is indicated by a first arrow sequence 122. This involves both the configuration data 58 and the association data 120 being transferred, for example by cable, from the computer 110 via a first configuration interface 124 provided for this purpose to the data memory 52 which is located in the control unit 28. In this case, the distribution unit is a data memory arranged in the safety controller 24. The data memory 52 arranged in the control unit 28 distributes the data packets 56, 56', 56'', 56''', 56'''', 118 over the individual data memories 52, 52', 52'', 52''', 52'''' and the data bus manager 116 in accordance with the program module association data contained in the association data 120. For this purpose, said data memory 52 is designed to be able to forward configuration data 58 which are supplied to it to at least one other data memory or to the data bus manager 116.

A second procedure is shown by a second arrow sequence 126. This involves the configuration data 58 and the association data 120 first of all being provided on an external distribution unit 128 which the computer 110 contains. In this case, the external distribution unit 128 corresponds in terms of its functionality to the data memory 52 which the control unit 28 contains. By way of example, the configuration data 58 are then supplied by a cable to the data bus 34 via a second configuration interface 130 provided for this purpose and are distributed over the individual data memories 52, 52', 52'', 52''', 52'''' and the data bus manager 116 in accordance with the program module association data which the association data 120 contain.

A third procedure is indicated by a third arrow sequence 132. This involves both the configuration data 58 and the association data 120 being transferred to a mobile storage medium 134. By way of example, the mobile storage medium 134 may be an SD card, a CF card or a USB stick. The mobile storage medium 134 is then inserted in a holding unit 136, provided for this purpose, with an integrated configuration interface. The configuration data 58 are then supplied to the data memory 52 contained in the control unit 28, which data memory undertakes the distribution of the data packets 56, 56', 56'', 56''', 56'''', 118. Program data and parameterization data can also be distributed in corresponding fashion.

As far as the distribution of the configuration data 58 over the individual data memories 52, 52', 52'', 52''', 52'''' and the data bus manager 116 is concerned, different approaches are feasible. On the basis of a first approach, the project data 58 are stored essentially in situ, i.e. at the location at which they are processed. By way of example, this is in that data memory in that control unit for whose data bus interface the configuration data are intended. This approach involves the program module association data being ascertained, by way of example, on the basis of associations which the writer of the user program makes. On the basis of a second approach, the association data 120 are ascertained on the basis of at least one data processing characteristic figure. This approach involves the configuration data 58 being distributed such that they are preferably stored in control components 26 which have a high data processing capacity. In order to allow arbitrary distribution of the configuration data over the individual data memories 52, 52', 52'', 52''', 52'''' or the data bus manager 116, at least some of the data memories 52, 52', 52'', 52''', 52'''' or the data bus manager must be designed to be able to forward supplied configuration data and to request configuration data. In order to increase the availability of the safety controller 24, at least some of the configuration data 58 can be stored redundantly in the data memories 52, 52', 52'', 52''', 52'''' and the data bus manager 116.

Figure 4:
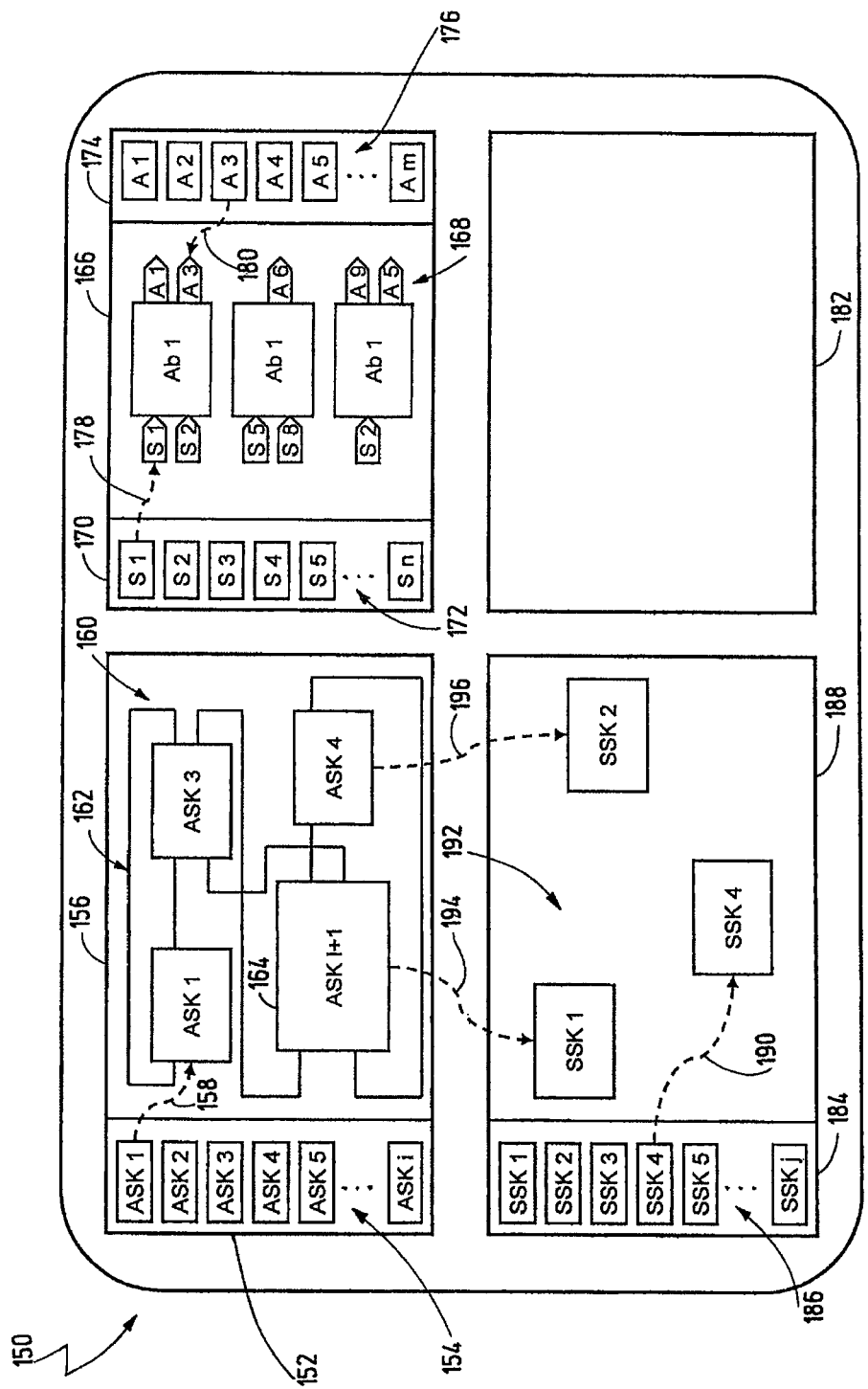
FIG. 4 shows a simplified illustration of a graphical interface for generating a user program.

In FIG. 4, a graphical interface is denoted as a whole by the reference numeral 150. This graphical interface 150 allows a programmer to write a user program and hence to produce program data. At the same time, besides the program data, parameterization data and the configuration data 58 are also produced.

The graphical user interface 150 contains an installation software component field 152 which contains a plurality of predefined installation software components 154 in the form of graphical symbols. The user program and hence the program data are written/produced by providing a plurality of installation software components. For this purpose, the graphical user interface 150 contains a first component field 156. The installation software components to be provided are selected and transferred to the first component field 156, as indicated by an arrow 158. The first component field 156 therefore contains a plurality of provided installation software components 160. Logic combination of the provided installation software components 160 writes a component subprogram. To this end, logic inputs and logic outputs of these installation software components are connected to one another, which is shown by a plurality of connections 162. In addition to the selection of predefined installation software components, it is also possible for new installation software components to be written, as indicated by a new installation software component 164. The individual software components may be what are known as elemental components, which themselves do not contain any further software components. Alternatively, they may be what are known as group components, which themselves contain further software components. An elemental component contains a plurality of aspect blocks. Each of these aspect blocks is associated with one of a plurality of different control aspects, each of these control aspects representing a separate subaspect of the safety controller. In this case, the installation software component contains all those aspect blocks which are significant to that installation component which represents the installation software component. In comparison with an elemental component, a group component additionally contains, besides the aspect blocks, software components which may be in the form of an elemental or group component. The use of group components allows a user program having a plurality of hierarchical levels to be written. Each of the provided installation software components 160 represents one of those program modules from which the user program is build overall. Advantageously, the different control aspects may be the following control aspects: standard control aspect, safety control aspect, diagnosis aspect, visualization aspect, entry control aspect, cooling aspect, access authorization aspect, maintenance aspect, locking aspect, manual operation aspect or data management aspect.

For each aspect block contained in an installation software component, at least those logic variables and/or those parameters and/or those sensor signals which are required for processing and can be supplied to the aspect block via associated inputs and those logic variables and/or those parameters and/or those output signals which are respectively ascertained in the number of aspect blocks and are output by the aspect block via associated outputs are first of all determined on their merits. The specific sensors and/or actuators which need to be connected to the respective aspect block are ultimately determined only when the user program is written. In addition, at least some of the aspect blocks contained in an installation software component store a respective functional program which determines aspect properties of the installation component for that control aspect with which the respective aspect block is associated.

The graphical interface 150 also contains an aspect field 166. This aspect field 166 contains a plurality of aspect blocks 168. Each of these aspect blocks is associated with the same control aspect. In this case, the plurality of aspect blocks 168 comprise the aspect blocks contained in all hierarchy levels of the user programmer. The graphical interface 150 also contains a sensor field 170. This sensor field 170 contains a plurality of graphical sensor symbols 172. For each sensor contained in the installation 10 to be controlled, a graphical sensor signal is provided. As a further field, the graphical interface 150 contains an actuator field 174. This actuator field 174 contains a plurality of graphical actuator symbols 176. For each actuator contained in the installation 10 to be controlled, a graphical actuator symbol is provided. An aspect subprogram is written for the plurality of aspect blocks 168 contained in the aspect field 166. To this end, at least some of the aspect blocks have what is known as I/O mapping performed both for the inputs thereof and for the outputs thereof. That is to say that at least some of the signal inputs are assigned those sensors whose sensor signals are processed in the respective aspect block. This is illustrated by way of example by an arrow 178. Furthermore, at least some of the control outputs are assigned actuators which are actuated with the output signals ascertained in the respective aspect block. This is indicated by way of example by an arrow 180. Alternatively, the I/O mapping can also be performed by means of text inputs in an input field 182.

The graphical interface 150 contains a control software component field 184 which contains a plurality of predefined control software components 186. Each of these control software components 186 represents a control component 26 which can be used in a safety controller 24 of distributed design. The graphical interface 170 also contains a second component field 188. In this second component field 188, the programmer of the user program can insert those control software components which represent those control components from which the distributed safety controller 24 is build. This is done by selecting individual control software components 186 and transferring them to the second component field 188, as indicated by way of example by an arrow 190. The second component field 188 therefore contains a plurality of provided control software components 192. If the programmer wishes to determine, at least for a subsection in the user program, which project data, particularly which program data and which configuration data, need to be processed in which control component 26 and therefore need to be stored in the associated data memory, he can associate at least some of the provided installation software components 160 with the provided control software components 192. This is indicated by program module associations 194, 196. These program module associations are used to ascertain program module association data and hence association data, which are then taken as a basis for ascertaining the configuration data 58.

The program module association data can advantageously also be ascertained automatically, i.e. without the programmer making program module associations. This involves at least one data processing characteristic figure being stored in a database for each control component 26 represented by a control software component 192, so that the program module associations can be made on the basis of these data processing characteristic figures, for example, and hence the program module association data can be ascertained. In this case, the program data and the configuration data are distributed over the individual control components and hence the data memories from the perspective of the data processing capacity of the individual control components. Alternatively, it is conceivable for the program module association data to be ascertained both on the basis of data processing characteristic figure values and on the basis of program module associations made by the programmer. By way of example, the data processing characteristic figure values can be used first of all to produce a proposal for an association, which proposal can then still be modified by the programmer on the basis of his ideas in accordance with program module associations which he has made.

For the aspect blocks 188, predefined parameterization data may be stored in a database. Furthermore, it is also possible for parameterization data to be modified or even prescribed, for example by virtue of appropriate inputs into the input field 182, when the user program is written. This can also be done after the user program has been written, for example.

The program module associations and hence the program module association data contain not only a piece of information about which program module is associated with which control software component and hence with which control component. The program module association data additionally contain further information. From the connections 162, they also contain data about which control components are connected to one another and which inputs and outputs of the individual control components are used to achieve this. In addition, the program module association data also contain a piece of information and hence data about which sensors and which actuators are associated with the individual control units. The aspect field 166 is used to make an association between the individual aspect blocks 168 and the sensors and actuators. In addition, it is known which functional programs are contained in the individual aspect blocks, i.e. which program input variables and program output variables or which data-consuming control instructions and which data-producing control instructions are processed in the individual aspect blocks. It is therefore determined which sensor is associated with which program input variable and which actuator is associated with which program output variable. Since the individual aspect blocks are each explicitly associated with an installation software component, it is also known which aspect block is contained in which installation software component. The program module associations mean that it is therefore known which sensor and which actuator is connected to which control unit. On the basis of the I/O mapping performed for the aspect blocks, it is also known which input and output terminals have the individual sensors and actuators associated with them. In other words: for the control units, both the input map and the output map are known. This is a piece of information which is relevant to the configuration of the communication relationships.

The procedure described with reference to FIG. 4 for generating a user program is based on a novel concept. For this novel concept, a functional view of the application and hence the automation problem to be solved is first of all taken. On the basis of this, a functional overall application is first of all developed irrespective of the control components which are later used. This involves the generating of a component subprogram, as described in connection with the first component field 156, and the generating of aspect subprograms, as described in connection with the aspect field 166, and possibly the generating of the functional programs contained in the aspect blocks. In a further step, the functional overall application is then split over a device configuration, i.e. over a plurality of control components, which are control units, sensors and actuators. The communication relationships which are required for the data interchange within the safety controller between the individual control components are ascertained automatically in this case. In comparison with the procedure to date, in which first of all a device configuration is produced and, on the basis of this, the individual programs for the control units contained in the appliance configuration are programmed and the communication relationships between the individual control units and the sensors and actuators are programmed in complex fashion manually, this novel concept has the following advantages: a user program, once written, has a high level of reusability. On account of the initially appliance-independent development of the functional overall application, a user program can be reused in a similar installation which is build at a later time. The high level of reusability relates not only to the entire user program, but also to the individual program modules from which the user program is build. This is advantageous when an already existing installation is to be modified. If, by way of example, a process station which is present in an installation needs to be doubled in order to increase the handling capacity of the installation, it is merely necessary to produce a copy of that installation software component which represents the process station. The copied installation software component then merely also needs to be connected to the already existing installation software components.

A further advantage is for scalability which results from the functional overall application first of all being developed independently of the appliance. It is thus possible for one and the same user program to be implemented on differently configured safety controllers. By way of example, this may be on a safety controller which merely has a large and hence powerful control unit or else on a safety controller of distributed design which contains a plurality of relatively small and therefore less powerful control units.

In addition, the time involvement for generating a user program is reduced. On account of the central functional view of a distributed system and on account of the fact that the programmer initially does not need to contemplate the control components which are to be used, he can concentrate on developing the functional overall application. In addition, the time involvement for complex manual full programming of the communication relationships is dispensed with.

The novel concept can therefore be used to control safety controllers of distributed design in a simple manner. All the advantages of a safety controller of distributed design can therefore be used. Installation availability is increased, since any faults affect only limited subregions of the safety controller. In addition, shorter reaction times can be produced, since genuine parallelization of control tasks is possible and subsections in a user program can be executed in situ. Furthermore, safety controllers can be produced less expensively. Firstly, the costs of wiring and generating the user program are lowered. Secondly, costs are lowered as a result of control functionalities being able to be implemented on intelligent input/output appliances which are available anyway.

The already mentioned fact that the novel concept is independent of appliances is manifested in two places. Firstly, the functional overall application is distributed over a safety controller of arbitrarily distributed design. This process is called deployment. Secondly, association of symbolic variables with physical inputs/outputs of the control units produces I/O mapping.

Figure 5:
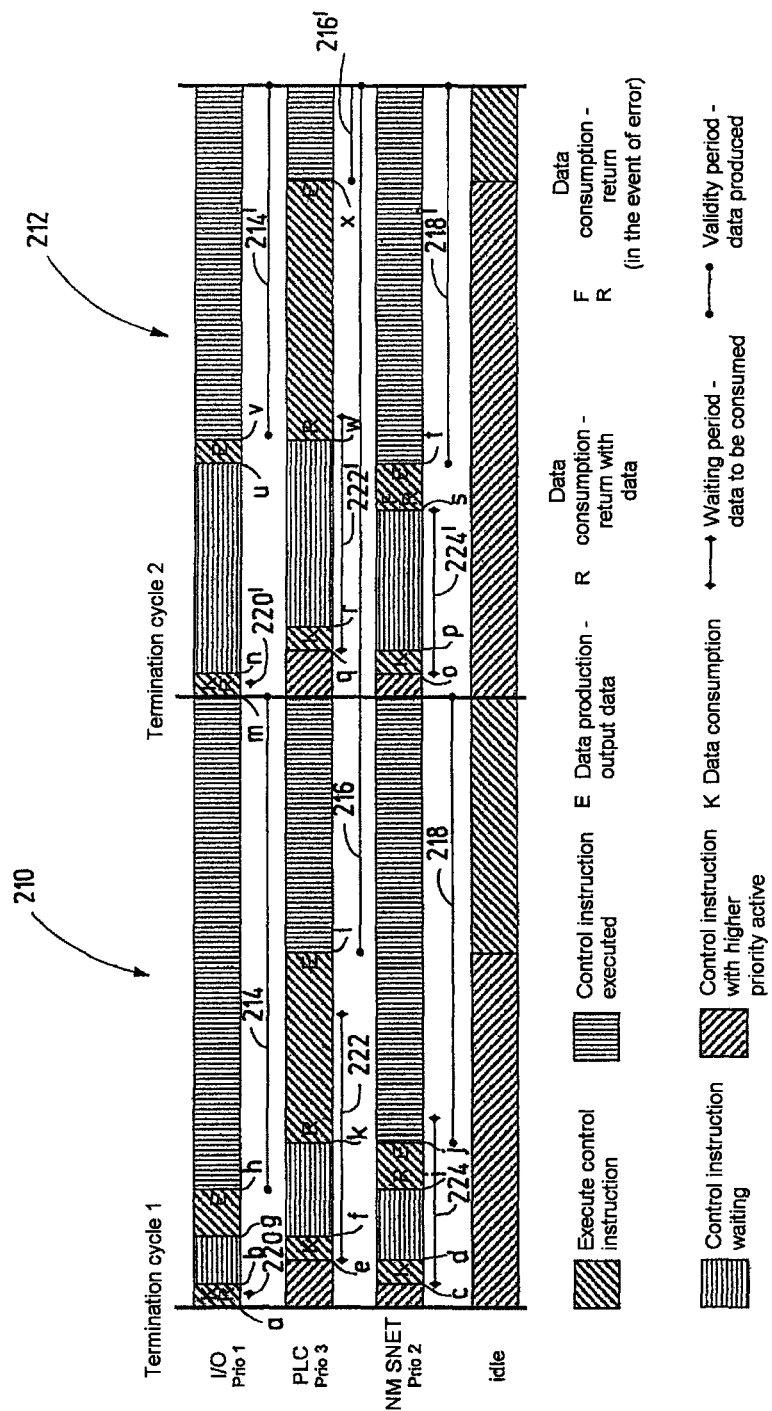
FIG. 5 shows a timing diagram to explain processing associations and configuration data resulting therefrom.

FIG. 5 shows two termination cycles 210, 212 in a signal processing chain, wherein the order of the processing associations is indicated by a letter sequence a to x. The signal processing chain comprises a plurality of control instructions which involve a plurality of units. These units are an input/output appliance denoted by "I/O", a control unit denoted by "PLC" and a data bus manager denoted by "NM SNET". These units have different associated priorities, the highest priority being denoted by "Prio 1" and the lowest priority being denoted by "Prio 3". Further control instructions, the priority of which is lower than "Prio 3" but which are not significant to the consideration below, are denoted by "idle". As can be seen from FIG. 5, the data bus manager NM SNET must in this case await data which are provided by the input/output appliance. The control unit must await both the input/output appliance and the data bus manager. The input/output appliance awaits data which are produced by the control unit in the preceding termination cycle.

FIG. 5 shows various validity periods. A first validity period 214 for data produced by the input/output appliance. A second validity period 216 for data produced by the control unit. A third validity period 218 for data produced by the data bus manager. Furthermore, FIG. 5 shows various waiting periods. The individual waiting periods indicate how long the respective unit awaits the data which are to be consumed by it. A first waiting period 220 for the input/output appliance. Since the input/output appliance has the respective first data consumption within a termination cycle, this waiting period is set at 0 seconds. A second waiting period 222 for the control unit. During this waiting period, the control unit awaits both the data produced by the input/output appliance and the data produced by the data bus manager. A third waiting period 224 for the data bus manager. During this waiting period, the data bus manager awaits the data produced by the input/output appliance. As can be seen from the illustration in FIG. 5, the waiting periods of the individual units are static, i.e. firmly defined, in each case. The period situated between the start and the end of the waiting period is identical for all termination cycles. By contrast, the validity period for the data produced by a unit can vary for the individual termination cycles. This stems from the fact that the respective validity period indicates for how many termination cycles the data produced are valid, with that termination cycle in which the data are produced also being taken into account. This results in the validity periods 214, 214' of the input/output appliance in the two termination cycles 210, 212 varying, for example, since the data produced by the input/output appliance are provided at different times within the respective termination cycle.

In the termination cycle 210, all data are produced in such timely fashion that they are available for the respective data consumption. In the termination cycle 212, on the other hand, the input/output appliance does not provide its data in timely fashion within the waiting period 224' of the data bus manager. For this reason, the data bus manager provides data which it has produced at the time denoted by s, even though the data which it requires from the input/output appliance are not available. This mechanism allows the data bus manager to continue to work, so that the control unit has data which it requires available. Allowing for waiting times makes it possible for the safety controller to work even when individual data are not provided in timely fashion. As far as the output of data by the data bus manager at the time denoted by s is concerned, a plurality of options are conceivable. By way of example, a predefined default value can be output or the value which is output in a preceding termination cycle can be output again.

Figure 6A:
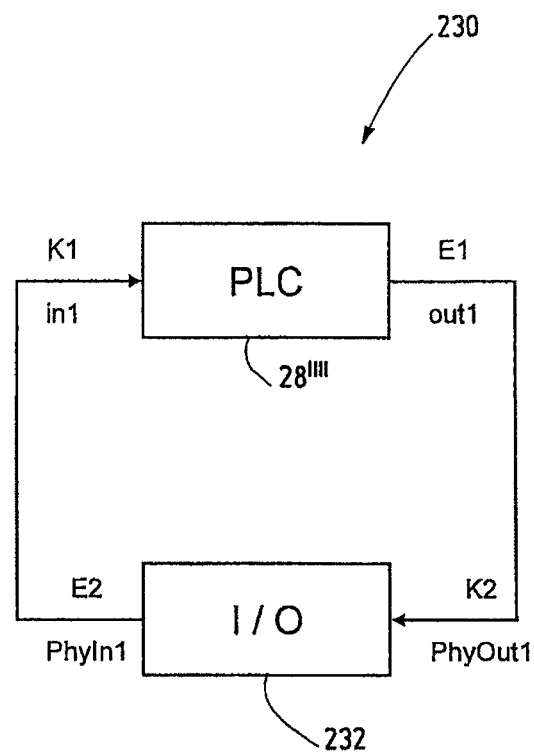
FIGS. 6a and 6b show a simplified illustration of a safety controller and an associated dependency graph to explain processing associations.
Figure 6B:
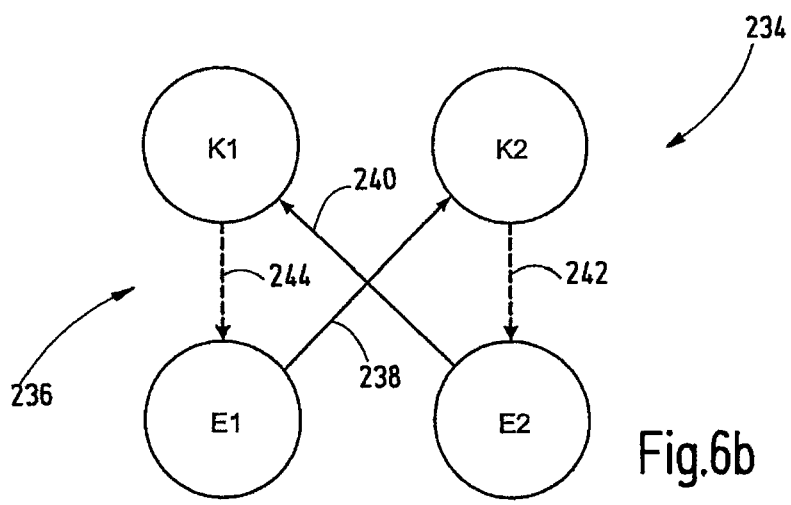

FIG. 6 comprises two figure parts 6a and 6b. Figure part 6a shows a safety controller 230 of simple design which comprises a control unit 28"" and an input/output appliance 232, both together forming a physical unit. The control unit 28"" executes the following user program:

```
PROGRAM MyPrg
VAR
    in1 AT %i*: BOOL;
    out1 AT %q*: BOOL;
END_VAR
    (* functional definition *)
END_PROGRAM
```

The inputs and outputs of the input/output appliance 232 are defined as follows:

```
PhyIn1 : BOOL; (* Input *)
PhyOut1 : BOO; (* Output *)
```

This results in the following I/O mapping:

```
in1 : PhyIn1
out1 : PhyOut1
```

This software-related circumstance presents itself as follows overall: the control unit 28"" takes a data-producing control instruction E1 as a basis for producing an instantaneous value for an output variable out1 which is output by the input/output appliance 232 via its output PhyOut1 on the basis of a data-consuming control instruction K2. At the same time, the input/output appliance 232 takes a data-producing control instruction E2 as a basis for reading in via its input PhyIn1 an instantaneous value which is allocated to an input variable in1 in the control unit 28"" on the basis of a data-consuming control instruction K1.

The processing order described above for the individual control instructions E1, E2, K1, K2 is shown in figure part 6b using a dependency graph 234 which has a plurality of processing associations 236. A first processing association 238 associates the data-producing control instruction E1 with the data-consuming control instruction K2. A second processing association 240 associates the data-producing control instruction E2 with the data-consuming control instruction K1. Furthermore, the data-producing control instruction E2 is dependent on the data-consuming control instruction K2, and the data-producing control instruction E1 is dependent on the data-consuming control instruction K1, as shown by a third processing association 242 and a fourth processing association 244. In this case, the processing associations 236 are ascertained on the basis of the following rules: a data-consuming control instruction is dependent on a data-producing control instruction when the data-consuming control instruction contains a variable which is likewise contained in the data-producing control instruction. A data-producing control instruction is dependent on a data-consuming control instruction when both control instructions belong to the same unit, for example the control unit 28"".

On the basis of the processing association data which represent the processing associations 236, configuration data are advantageously ascertained as follows: when the data-producing and data-consuming control instructions in the signal processing chain under consideration have been determined and the processing associations between the individual control instructions are ascertained in a first step, the cycle times which apply to these control instructions are ascertained in a second step. The starting point for this is the cycle times predefined for the safety controller. In the present example, a cycle time of 20 milliseconds is predefined for the control unit 28"". By contrast, no cycle time is predefined for the input/output appliance 232. Therefore, a cycle time of 20 milliseconds applies both to the data-producing control instruction E1 and to the data-consuming control instruction K1. From those control instructions for which predefined cycle times apply, the cycle times for those control instructions for which no predefined control instructions apply are then ascertained automatically. In the present example, these are the two control instructions E2 and K2.

This involves application of the following mechanism: from a data-consuming control instruction for which a cycle time is predefined, those data-producing and data-consuming control instructions which can be achieved directly from said data-consuming control instruction are ascertained contrary to the processing directions prescribed by the processing associations, that is to say backwards. For these control instructions, the predefined cycle time is likewise assumed to be valid. In this case, the process continues until no further change is obtained. In the present example, the data-producing control instruction E2 can be achieved directly for the data-consuming control instruction K1. Hence, for this control instruction too, the cycle time of 20 milliseconds applies. From a data-producing control instruction for which a cycle time is predefined, those data-producing and data-consuming control instructions which can be achieved directly from said data-producing control instruction are ascertained in accordance with the processing directions prescribed by the processing associations, that is to say forwards. For these control instructions, the predefined cycle time is likewise assumed to be valid. In this case, the process continues until no further change is obtained. In the present example, the data-consuming control instruction K2 can be achieved directly for the data-producing control instruction E1. Hence, for this control instruction too, the cycle time of 20 milliseconds applies.

If a respective plurality of cycle times are ascertained for a number of the data-producing or data-consuming control instructions, a basic cycle time needs to be ascertained for every single one of these control instructions. The basic cycle time is then obtained as the highest common factor for the individual cycle times. The requirement to ascertain basic cycle times arises predominantly when data-producing and data-consuming control instructions in a plurality of interconnected signal processing chains are being considered. The ascertainment of basic cycle times involves a need to take account of constraints, such as minimum and maximum cycle times and the reaction time of the safety controller. In the present example, no basic cycle time needs to be ascertained.

In a further step, a termination cycle time is ascertained. This is obtained as the highest common factor for the cycle times, possibly for the basic cycle times of all data-producing and data-consuming control instructions under consideration. The termination cycle time defines the individual times at which the data from the data-producing control instructions under consideration need to be available at the latest in order to achieve a deterministic response to the safety controller. Advantageously, the termination cycle time is, all in all, standard for a project. Alternatively, it is conceivable to permit a plurality of termination cycle times within a project. However, these then need to be in an integer ratio with respect to one another. In this case, the basis is the minimum termination cycle time. By way of example, this is important when a control component which has a strict minimum termination cycle time is used within a safety controller. In this case, it is necessary to prevent the other components of the safety controller from having their handling speed impaired. Advantageously, it is also possible to permit a termination cycle time which is shorter than the highest common factor. In the present example, the termination cycle time is 20 milliseconds.

In a further step, validity periods are respectively ascertained for the data-producing control instructions under consideration. Advantageously, the respective validity period corresponds to the respective cycle time, possibly the respective basic cycle time for the data-producing control instruction. In this case, however, care should be taken to ensure that cyclic dependencies are resolved. Thus, the case must not arise in which the validity periods end at of the same termination cycle for all data-producing control instructions under consideration. If this were the case, this would result in reciprocal blocking of the control instructions. A cyclic dependency is resolved by doubling the validity period for one of the data-producing control instructions, for example. In the present example, both data-producing control instructions E1 and E2 have a respective validity period of 20 milliseconds. Therefore, there is a cyclic dependency. By way of example, this is resolved by increasing the validity period for the data-producing control instruction E1 to 40 milliseconds.

In a further step, the respective waiting periods are ascertained for the data-consuming control instructions under consideration. In this case, the value of the waiting period is obtained as half the value of the respective cycle time, possibly of the respective basic cycle time of the respective control instruction. In the present example, the waiting period for the data-consuming control instruction K1 is 10 milliseconds. The waiting period for the data-consuming control instruction K2 is likewise 10 milliseconds.

From the processing association data, the following configuration data are thus automatically ascertained in this case: the termination cycle time, the cycle times or basic cycle times of the individual control instructions, the validity periods for the data-producing control instructions and the waiting periods for the data-consuming control instructions.

Since, in the present example, the control unit 28'''' and the input/output appliance 32 form a physical unit, the configuration data do not comprise any synchronization data. If the data-producing and data-consuming control instructions under consideration for a signal processing chain are split over a plurality of control components in a safety controller, synchronization data are also ascertained automatically on the basis of the handling association data.

On the basis of program module association data, data frame allocation data are ascertained. Hence, the configuration data can be comprehensively ascertained on the basis of association data.

The mechanism described in connection with figure parts 6a and 6b is executed by the computer program 114 automatically, i.e. by itself, once the writer of the user program has prescribed a defined cycle time for the control unit 28'''. The configuration data from the further control components interacting with the control unit 28''' are ascertained automatically on the basis of the defined cycle time for the control unit 28'''. Self-evidently, this mechanism can be applied to other control instructions, such as the control instructions contained in a program module. The configuration data can therefore be ascertained in a manner oriented to the individual program modules. Alternatively, it is conceivable for this mechanism to be applied to all control instructions in the user program one time only.

The mechanism described above is also used to automatically ascertain the following configuration data for the data bus manager: a validity period, data which can be used to synchronize the individual clocks of the individual control components, and data which can be used to synchronize the individual timer interrupts of the individual control components.

Preferably, the mechanism described above is used to configure communication relationships which are used to transmit realtime data.

Figure 7:
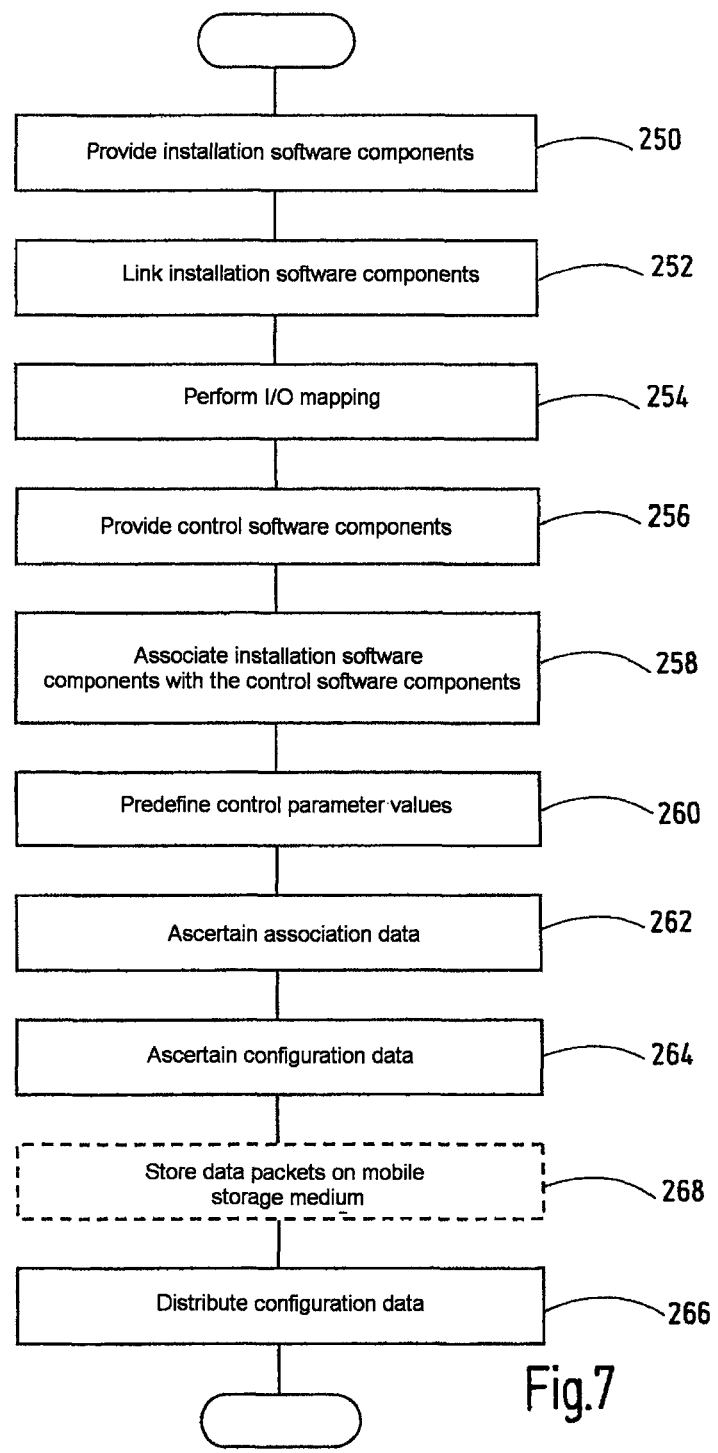
FIG. 7 shows a simplified flowchart to explain the novel method.

The flowchart shown in FIG. 7 shows the flow of the novel method. In accordance with a step 250, installation software components are provided. In a subsequent step 252, the installation software components are linked. This is followed by a step 254, in which I/O mapping is performed for the aspect blocks contained in the installation software components. In a subsequent step 256, control software components are provided. In a subsequent step 258, the installation software components are associated with the control software components. In a further step 260, selected control parameter values are predefined by the programmer. By way of example, values are prescribed for individual cycle times and/or sampling rates, or the reaction time of the safety controller is defined. The reaction time is that time which elapses from recognition of an input signal to the changing of an output signal which is linked thereto. In a further step 262, association data are ascertained. In this case, the association data comprise program module association data and processing association data. The program module association data represent program module associations prescribed by the programmer of the user program. The program module association data may alternatively represent program module associations ascertained on the basis of data processing characteristic figures. The processing association data represent a number of processing associations which, for at least some of the control instructions, define a processing order for the individual control instructions. In the next step 264, the configuration data are now ascertained automatically on the basis of the association data. In a step 266, the configuration data are then distributed over the data bus manager and the individual control components. Depending on the procedure which is used to distribute the configuration data, the step 266 does not follow the step 264 directly. If the configuration data are distributed using a mobile storage medium, a step 268 is performed between the step 264 and the step 266, said step 268 involving the configuration data and the association data being stored on the mobile storage medium.

The novel safety controller and the novel method therefore allow automatic ascertainment of a plurality of configuration data for the communication relationships of a safety controller on the basis of a few guidelines which are selected by the programmer of the safety controller. It is particularly advantageous if the configuration data for the data bus manager are determined automatically using the guidelines selected by the programmer. The novel method thus also involves the data bus manager in the configuration of the control components. As far as the automatic ascertainment of the configuration data is concerned, attention is in this case directed to firstly allowing short reaction times for the safety controller and secondly minimizing possible jitter in the process time.

What is claimed is:
1. A safety controller for controlling an automated installation in accordance with a user program, the safety controller comprising:
a plurality of control components, wherein at least some of the control components have a data bus interface, with the data bus interface being designed to receive and to send data, a data bus connecting the plurality of control components via said data bus interfaces for the purpose of interchanging data, a programming tool for generating the user program, and a configuration interface designed to receive configuration data, wherein the configuration data determine at least one characteristic of at least one data bus interface in order to configure communication relationships among the plurality of control components, wherein said configuration data is ascertained on the basis of association data generated by the programming tool, wherein the use program comprises a plurality of individual control instructions which comprise a plurality of data-producing control instructions and a plurality of data-consuming control instructions, wherein the association data define, for at least some of the individual control instructions, a processing order for the individual control instructions, and wherein the configuration data comprise termination cycle time data representing a termination cycle time, said termination cycle time defining a time basis having equidistantly spaced time intervals at which data produced by the data-producing control instructions need to be present for the plurality of data-consuming control instructions.

2. The safety controller of claim 1, wherein the user program comprises a plurality of program modules associated to each other, wherein the association data further comprise program module association data representing program module associations, and wherein the program module associations each define an association between a control component and a respective program module.

3. The safety controller of claim 1, wherein the configuration data are also ascertained on the basis of a number of predefined control parameters.

4. The safety controller of claim 3, wherein the control parameters are at least one of the following: a first control parameter representing a reaction time, a second control parameter representing a cycle time, and a third control parameter representing a sampling rate.

5. The safety controller of claim 1, wherein the configuration data are also ascertained on the basis of a number of data processing characteristic figures.

6. The safety controller of claim 5, wherein the association data represent the data processing characteristic figures.

7. The safety controller of claim 1, wherein at least some of the control components have a data memory designed to store data, and wherein the safety controller has a distribution unit designed to distribute the configuration data over at least some of the control components via the data bus.

8. The safety controller of claim 7, wherein at least some of the configuration data are redundantly stored in at least two different data memories.

9. The safety controller of claim 7, wherein the distribution unit comprises one of said data memories.

10. The safety controller of claim 1, wherein the configuration data comprise a plurality of data blocks, wherein at least one data block is associated with the data bus and some other data blocks are respectively associated with the data bus interfaces.

11. The safety controller of claim 1, wherein the configuration data further comprise one or more of the following data:
  validity time data representing a validity period during which data produced are valid,
  waiting time data representing a waiting period during which a data-consuming control instruction awaits data,
  synchronization data, on the basis of which the control components are synchronized,
  data frame allocation data representing a number of data frame allocations, wherein, for at least one of the control components, the data frame allocations define data fields of data frame transmitted over the data bus, which data fields are allocated to the control components for transmitting or receiving data.

12. A method for generating a user program for a safety controller designed to control an automated installation in accordance with a user program comprising a number of program sections, wherein the safety controller comprises a plurality of control components and a data bus, said control components each having a data bus interface designed to receive and send data, and wherein the plurality of control components are connected to the data bus via the respective data bus interface for the purpose of interchanging data, the method comprising the steps of:

ascertaining association data representing an association between a subsection of the user program and a defined control component, ascertaining configuration data on the basis of the association data, and configuring at least one data bus interface using the configuration data, with the configuration data determining a characteristic of said at least one data bus interface in order to configure communication relationships among the plurality of control components, wherein the user program is generated with a plurality of individual control instructions which comprise a plurality of data-producing control instructions and a plurality of data-consuming control instructions, wherein the association data define, for at least some of the individual control instructions, a processing order for the individual control instructions, and wherein the configuration data comprise termination cycle time data representing a termination cycle time, said termination cycle time defining a time basis having equidistantly spaced time intervals at which data produced by the data-producing control instructions need to be present for the plurality of data-consuming control instructions.

* * * * *